United States Patent Office 2,740,815
Patented Apr. 3, 1956

2,740,815

PRODUCTION OF AMINO CARBOXYLIC ACID COMPOUNDS

Hans Feichtinger, Duisburg-Beeck, and Hans Tummes, Duisburg-Meiderich, Germany, assignors to Ruhrchemie Aktiengesellschaft, Oberhausen-Holten, Germany, a German corporation No Drawing. Application February 25, 1953,
Serial No. 338,884

Claims priority, application Germany March 1, 1952

7 Claims. (Cl. 260—556)

This invention relates to improvements in amino carboxylic acid compounds. It more particularly relates to the production of amino carboxylic acid amides which are acylated or sulfonated at the nitrogen atom.

The production of carboxylic acid amides and carboxylic ammonium salts from aliphatic ketones which contain cyclo aliphatic, aromatic or heterocyclic radicals as part of their carbon skeleton in one synthesis stage according to the Willgerodt reaction is known. (See M. Carmack and M. A. Spielman, "The Willgerodt Reaction," Adams "Organic Reactions," vol. III, pages 83–107 (1946), published by John Wiley & Sons, Inc., New York, N. Y.) This reaction proceeds in accordance with the following:

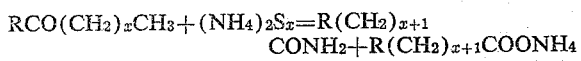

$RCO(CH_2)_xCH_3 + (NH_4)_2S_x = R(CH_2)_{x+1}$
$CONH_2 + R(CH_2)_{x+1}COONH_4$ in which R is the cycloaliphatic, aromatic, or heterocyclic radical, and x represents the number of methylene groups between the keto group and the terminal methyl group which may range from between 0 and about 4.

This Willgerodt reaction may be effected by using instead of the starting aliphatic ketones other starting products. These starting products are similar in structure to the ketones but have, instead of the oxygen of the keto group, other monovalent or bivalent substituents, such as, for example, thioketo, mercapto, nitro, amino, rhodano or halide groups. The keto groups may also be replaced by olefinic or acetylenic bonds. In this case, similar to the other substitutents mentioned above, the carbon skeleton of the starting compound remains unchanged in the reaction.

The reactivity of the functional groups and bonds mentioned above differ from one another in the Willgerodt reaction. The amino, nitro and oxy groups have in general a low reactivity. The other groups show with certain variations a considerably better reactivity. If starting compounds are used which contain two substituents which belong to different members of the above-mentioned group, the reaction may be effected in such a manner that one of these substituents, such as, for example, an amino group, remains unchanged in the aliphatic chain during the reaction, while the other substituent results in the oxidation of the terminal methyl group.

Thus, for example, chlorinated aliphatic n-1-amine hydrochlorides react with aqueous ammonium polysulfide solutions in accordance with the Willgerodt reaction to produce ω-amino carboxylic acid amides and the corresponding ω-amino carboxylic acids. Due, however, to side reactions, as, for example, polymerization and condensation reactions, only very low yields are obtained.

One object of this invention is the production of amino carboxylic acid amides acylated or sulfonated at the nitrogen atom. This, and still further objects, will become apparent from the following description:

It has now been found in accordance with the invention that the Willgerodt reaction may be effected with surprisingly superior results if instead of chloramine hydrochlorides, uniform chloramines or chlorination mixtures of amines, which are acylated or sulfonated at the nitrogen atom, are used.

The N-acylated or sulfonated chlorinated amines are reacted with aqueous ammonium polysulfide solutions at 150–300° C. and preferably at 150–180° C. Instead of the ammonium polysulfide solution, aqueous ammonia solutions, and elemental sulfur may be used. It is advanatgeous to effect the conversion in the presence of organic diluents or organic solvents. The reaction time is from 1 to 20 hours, and preferably from 2 to 6 hours.

The starting N-acylated or sulfonated chlorinated amine in accordance with the invention has the following general formula:

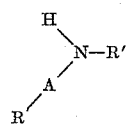

in which R is an aromatic radical and R' is a chlorinated, straight-chain aliphatic radical. A is:

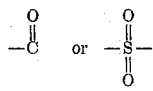

When A is CO, the carboxylic acid derivatives used for the acylation of the nitrogen atom, are preferably of the type which may be linked like amides or imides to the nitrogen atom of the chloramines to be converted. In this case the acylated ω-aminocarboxylic acids or ω-aminocarboxylic acid amides are obtained as final products of the reaction.

According to the invention, the amino group may also be protected during the Willgerodt reaction by sulfonic acid derivatives, which, as contrasted to the acyl group, adhere more firmly to the nitrogen atom. The use of A as the SO₂ group has the advantage that an amonolytic cleavage is avoided during the reaction. Particularly well suited for the protection of the nitrogen atom is the p-toluene sulfonyl radical. The process, in accordance with the invention, is, however, not limited to p-toluene sulfonyl radicals and other sulfonyl radicals may be used for the protection of the amino group. If the amino group is protected by sulfonic acid derivatives, i. e., if A is SO₂, then sulfonated ω-amino carboxylic acid amides are obtained as the final products of the reaction.

The conversion in accordance with the invention of the chloramines acylated or sulfonated at the nitrogen atom is effected in the conventional manner with aqueous ammonium polysulfide solutions. The yields obtained are largely dependent upon the composition of the reaction solution, which, in general, contains about 5–20 mols ammonia, 0.1–5 mols hydrogen sulfide, and 1–10 gram atoms of sulfur per liter. It is, however, also possible to use reaction solutions with higher or lower quantitative proportions than those mentioned above.

The reaction generally proceeds in accordance with the following:

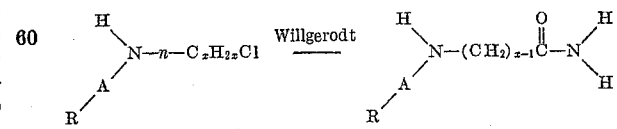

in which R and A are as given above in the general formula.

According to the formula given above, the chlorine substituent needs not be positioned at the end of the aliphatic carbon chains. Compounds in which the chlorine is positioned at a distance of about 2 to 4 carbon atoms from the methyl end of the straight, saturated and unbranched chain are also suitable. Therefore, not only homogeneous chlorine compounds but also mixtures of chlorine compounds in which the halide substituent is statistically distributed over a short carbon chain of about 3 to 6 carbon atoms are suited for the conversion according to the reaction scheme given above. Chlorination mixtures of this kind are obtained, for example, by chlorinating aliphatic primary amine hydrochlorides. Depending on the degree of chlorination, the carbon chain is then more or less occupied so that a part is unchlorinated. This unchlorinated part is not reactive under the conditions of the process mentioned and may be recovered unchanged from the reaction products.

The oxidation scheme corresponds to a mechanism which has been developed by King and McMillan, Carmack and coworkers, and by Brown and coworkers. (See King and McMillan, J. Am. Chem. Soc., 68, 525, 632, 1369 (1946); 70, 4143 (1948); Carmack and coworkers, J. Am. Chem. Soc., 68, 2025, 2029, 2034 (1946); Brown and coworkers, J. Am. Chem. Soc., 73, 3735 (1951) ).

The ratio of ammonium polysulfide solution to the starting material charged may also be varied within wide limits. In general it is of advantage to use 2–20 and preferably 4–8 parts of ammonium polysulfide solution per part of starting material. To obtain a homogeneous reaction solution, organic solvents such as alcohols, dioxane, hydrocarbons, ether, pyridine or other solvents remaining undecomposed during the reaction may be added.

The reaction is most advantageously effected in a closed reaction vessel which consists of steel, glass, porcelain or other resistant materials. The pressure developing during the reaction by external heating is dependent on the vapor pressure of the reaction mixture and amounts to about 5–40 kilos/sq. cm. However, considerably higher reaction pressures may occur if, for example, gaseous ammonia is in addition passed under pressure into the reaction vessel. After the termination of the reaction the pressure drops, when cooling to room temperature, to the vapor pressure of the reaction mixture. In many cases, it is not necessary, therefore, when opening the reaction vessel, to effect equalization to the atmospheric pressure.

The reaction temperatures required for the conversion range in general between 100° and 300° C., and preferably between 150° and 180° C. The reaction time is dependent on the particular operating conditions and may be as long as 20 hours.

The aminocarboxylic acid compounds obtained, which are acylated or sulfonated at the nitrogen atom, are separated by means of hot water from the reaction solution after having evaporated the same to dryness, and are further purified in the conventional manner by subjecting them, if necessary or desired, to recrystallization. The products obtained may be used for various purposes and represent valuable starting materials for organic syntheses.

The following examples are given by way of illustration and not limitation.

*Example 1*

30 grams N-(ε-chlor-n-amyl)-benzamide, 120 cc. aqueous ammonium hydrogen sulfide solution and 80 cc. pyridine were heated in a steel bomb of 300 cc. capacity for 6 hours at 160° C. The ammonium hydrogen sulfide solution contained per liter 2.1 mols $H_2S$ and 10.1 mols $NH_3$ and had been mixed with 33 g. sulfur.

After the termination of the reaction, the dark red, clear reaction solution was evaporated to dryness on the water bath, and the residue from the evaporation was thoroughly extracted with hot water. At 0° C., δ-benzoamido-n-valeric acid amide crystallized to form yellowish needles from the aqueous extract solution. After recrystallization from water, 13 gms. final product, having a melting point of 180° C., was obtained. The yield was 44% of the theoretical yield.

*Example 2*

45 gms. chlorinated N-n-amyl-benzamide which was substituted in the aliphatic carbon chain with the stoichiometrical quantity of 0.93 gram atom chlorine, 50 gms. sulfur, 300 cc. aqueous ammonium hydrogen sulfide solution and 200 cc. pyridine were heated in a steel bomb of 300 capacity for 6 hours at 160° C. Similar to Example 1, the ammonium hydrogen sulfide solution contained per liter 2.1 mols $H_2S$ and 10.1 mols $NH_3$.

By extraction with hot water, 13 gms. δ-benzamido-n-valeric acid amide having a melting point of 180° C. and corresponding to 30% of the theoretically possible yield were obtained from the reaction product.

*Example 3*

45 grams chlorinated N-n-hexyl-benzamide, which was substituted in its aliphatic carbon chain with the stoichiometrical quantity of 1.23 gram atom of chlorine, 50 gms. sulfur, 300 cc. aqueous ammonium hydrogen sulfide solution of the composition given above, and 200 cc. dioxane, were treated in the autoclave used in Example 1 in the manner described above and worked up. 10 grams ε-benzamido-n-caproic acid amide having a melting point of 143° C. and corresponding to 23% of the theoretical yield were obtained as the final product.

*Example 4*

80 grams N-(ε-n-chlor-n-amyl)-p-toluene sulfamide, 500 cc. aqueous ammonium hydrogen sulfide solution of the composition given above, 80 grams sulfur, and 300 cc. pyridine were heated in the steel autoclave for 6 hours at 160° C. and worked up in the manner described in Example 1. 56 grams δ-p-toluene sulfamino-n-valeric acid amide having a melting point of 133° C. and corresponding to 71.5% of the theoretically possible yield were obtained.

*Example 5*

40 gms. chlorinated N-n-amyl-p-toluene sulfamide, which was substituted in the aliphatic carbon chain with the stoichiometrical quantity of 1 gram atom chlorine, 40 gms. sulfur, 250 cc. aqueous ammonium hydrogen sulfide solution of the composition given above, and 250 cc. pyridine were treated in the steel autoclave and worked up as described in the preceding examples. By exhaustive extraction with hot water, 14 gms. of δ-p-toluene-sulfamino-n-valeric acid amide corresponding to 35.7% of the theoretically possible yield, were obtained. The melting point of the compound was 133° C.

*Example 6*

12 gms. chlorinated N-n-hexyl-p-toluene sulfamide, which was substituted in the aliphatic carbon chain with the stoichiometrical quantity of 1.12 gram atoms chlorine, 12 gms. sulfur, 75 cc. aqueous ammonium hydrogen sulfide solution of the composition given above, and 75 cc. dioxane, were heated in a steel tube for 6 hours at 160° C. The reaction solution was evaporated in vacuo and the residue on evaporation was extracted several times with hot water. By cooling the aqueous extract solution, 2.8 grams ε-p-toluene-sulfamino-n-caproic acid amide corresponding to 23.8% of the theoretically possible yield were obtained. The melting point of the compound was 138° C.

We claim:

1. Process for the production of ω-benzoylamino carboxylic acid amides and ω-p-toluene sulfonylamine carboxylic acid amides, which comprises contacting compounds of the general formula R—A—NH—R', in which A is a member of the group consisting of C=O and $$S\underset{O}{\overset{O}{\lessgtr}}$$

groups, R is a member selected from the group consisting of the phenyl and p-tolyl radicals and R' is a chlorinated, saturated, straight-chain aliphatic radical having from 5 to 6 carbon atoms in its chain of the formula $C_nH_{2n}Cl$, with aqueous ammonium polysulfide solutions at temperatures of 150–300° C. in closed systems, and recovering from the mixture of reactants ω-amino carboxylic acid amides which bear at the nitrogen atom a member selected from the group consisting of a benzoyl and p-toluene-sulfonyl group.

2. Process according to claim 1, in which said contacting is effected at a temperature of about 150–180° C.

3. Process according to claim 1, in which said contacting is effected in the presence of an organic diluent.

4. Process according to claim 1, in which pyridine is admixed to said aqueous ammonium polysulfide solution.

5. Process according to claim 1, in which dioxane is admixed as organic solvent to said aqueous ammonium polysulfide solution.

6. Process according to claim 1, in which said contacting is effected for about 1–20 hours.

7. Process according to claim 5, in which said contacting is effected for about 2–6 hours.

References Cited in the file of this patent

UNITED STATES PATENTS

| | | |
|---|---|---|
| 2,459,706 | King | Jan. 18, 1949 |
| 2,495,567 | Carmack et al. | Jan. 24, 1950 |
| 2,532,369 | Patrick et al. | Dec. 5, 1950 |

OTHER REFERENCES

Adams et al.: "Organic Reactions," vol. III, pp. 84–98, 107 (1946.)